Feb. 16, 1926.

F. L. BAKER 1,573,127

LUBRICATING SYSTEM FOR MOTOR VEHICLES

Filed March 5, 1923

Inventor
Frank L. Baker
By Fred Gerlach
his Atty.

Patented Feb. 16, 1926.

1,573,127

UNITED STATES PATENT OFFICE.

FRANK L. BAKER, OF CHICAGO, ILLINOIS.

LUBRICATING SYSTEM FOR MOTOR VEHICLES.

Application filed March 5, 1923. Serial No. 622,787.

*To all whom it may concern:*

Be it known that I, FRANK L. BAKER, a citizen of the United States, and a resident of Chicago, in the county of Cook and State of Illinois, have invented certain new and useful Improvements in Lubricating Systems for Motor Vehicles, of which the following is a full, clear, and exact description.

The invention relates to lubricating systems for motor vehicles and its object is to provide a connection between a pipe and a part relatively movable thereto which is adapted to prevent leakage of oil without the necessity of occasional adjustment.

The invention consists in the several novel features hereinafter set forth and more particularly defined by claims at the conclusion hereof.

Figure 1:
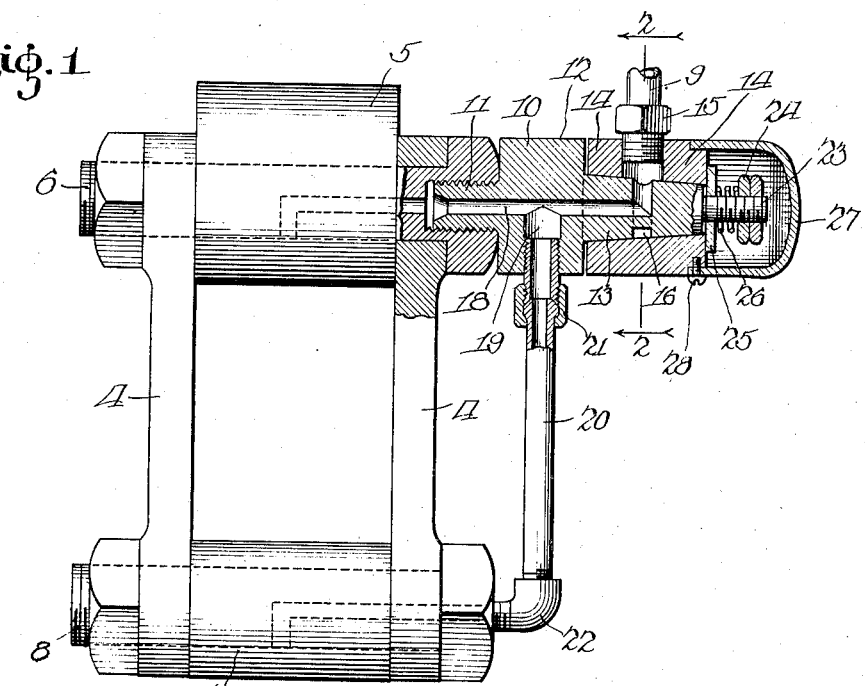
Figure 2:
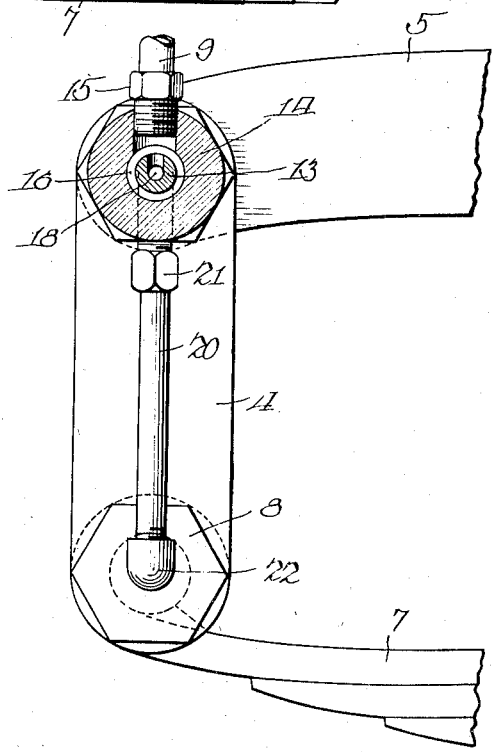

In the drawings: Fig. 1 is a view partly in section and partly in elevation, showing the invention applied to one of the spring shackles of a motor vehicle. Fig. 2 is a section on line 2—2 of Fig. 1.

The invention is exemplified in connection with a shackle comprising members 4 which are connected to the frame 5 by a bolt 6 and to a spring 7 by a bolt 8. The shackle and its connections may be of any suitable construction as well understood in the art.

The improved connection is adapted to supply oil to the bolts 6 and 8 from a copper tube 9 which is usually connected to an automatic lubricating system. The improved connection comprises a plug 10 which is provided with a screw-threaded stem 11 fitting into a corresponding thread in the shackle bolt 6. A hexagonal portion 12 is formed on the plug so that it may be turned into the bolt. The plug is provided with an integral tapered extension 13 on which is fitted a sleeve 14 which has a corresponding tapered or conoidal socket to fit snugly around stem 13. Copper pipe 9 is connected by a suitable plug coupling 15 to sleeve 14 which is provided with a duct to deliver oil into an annular groove 16 formed in the periphery of stem 13. A duct 18 delivers oil from groove 16 into the oil hole in bolt 6. A branch duct 19 delivers oil from duct 18 into a copper tube 20 which is connected by a plug coupling 21 to plug 10 and to shackle bolt 8 by a plug coupling 22. Stem 13 is extended beyond sleeve 14, as at 23, and is there screw-threaded for a pair of nuts 24, which serve as an adjustable locked abutment for a coil-spring 26, the inner end of which engages a washer 25 to press the conical faces of the casing and stem together and form an oil-tight bearing between them which will permit relative rotations without the escape of oil from groove 16. A cap 27 extends around and encloses the outer end of stem 13 and the spring. This cap is held in position by the screw 28 to the sleeve so that it can be removed to permit the nuts 24 to be adjusted when it is desired to adjust the tension of the spring.

The invention exemplifies a swivel connection for lubricating systems in which the casing and plug or relatively movable members are pressed together by a spring so as to prevent the escape of oil. By providing tapered bearing surfaces between the plug and sleeve and spring pressure to hold them in engagement, any wear is automatically taken up, because the copper pipe is usually sufficiently flexible to permit this to be done.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a lubricating device, the combination of a shackle bolt, a member at one end of and connected to said bolt having a conoidal periphery, a sleeve rotatable relatively to said member and having a correspondingly conoidal socket fitting around said periphery, a supply pipe connected to deliver oil into the sleeve, an oil duct leading from the sleeve through said member and bolt, and spring means to hold the conoidal peripheries of the member and sleeve in fluid-tight relation to prevent escape of oil between said member and said sleeve.

2. In a lubricating device, the combination of a shackle bolt, a member having a screw thread at one end for connection with a thread on one end of said shackle bolt and provided at its other end with a conoidal extension, a sleeve rotatable relatively to said member and having a correspondingly conoidal socket fitting around said conoidal extension, a supply pipe connected to deliver oil into the sleeve, an oil duct leading from the sleeve through the member and bolt to the bolt bearing, and spring means for holding the conoidal surfaces of the sleeve and extension in fluid-tight relation to prevent escape of oil between said sleeve and said extension.

3. In a lubricating device, the combination of a shackle bolt, a member at one end of and connected to said bolt and provided with an outwardly tapered conoidal periphery, a sleeve rotatable relatively to said member and having a correspondingly conoidal socket fitting around said conoidal periphery, a supply pipe connected to deliver oil into the sleeve, an oil duct leading from the sleeve through the member and bolt to the bolt bearing, and spring means to hold the outwardly tapered conoidal periphery of the member and the sleeve socket in fluid-tight relation to prevent the escape of oil between said member and said sleeve.

4. In a lubricating device, the combination of a shackle bolt, a member at one end of and connected to said bolt and provided with a conoidal periphery, a sleeve rotatable relatively to said member and having a correspondingly conoidal socket fitting around said conoidal periphery, a supply pipe connected to deliver oil into the sleeve, means for conducting oil from the sleeve through said member and bolt to the bolt bearing, and means for holding the conoidal peripheries of the sleeve and member in fluid-tight relation comprising a stem on the member, a spring around said stem and pressing said sleeve and member together, and means to adjust the tension of said spring.

5. In a lubricating device, the combination of a shackle bolt, a member at one end of and connected to said bolt and provided with a conoidal periphery, means for conducting oil through said member and bolt to the bolt bearing, a sleeve rotatable relatively to said member and provided with a duct in continuous communication with said oil conducting means, and with a correspondingly conoidal socket fitting around said conoidal periphery, a supply pipe connected to deliver oil into the sleeve, and spring means for holding the conoidal peripheries of the sleeve and member in fluid-tight relation to prevent escape of oil between said member and said sleeve.

Signed at Chicago, Illinois this 7th day of February, 1923.

FRANK L. BAKER.